(12) United States Patent
Wilkin

(10) Patent No.: US 6,408,992 B1
(45) Date of Patent: Jun. 25, 2002

(54) STAINLESS STEEL BRAKE STAR ADJUSTER

(76) Inventor: Larry E. Wilkin, 305 Ulysses St., Simi Valley, CA (US) 93065

( * ) Notice: Subject to any disclaimer, the term of this patent is extended or adjusted under 35 U.S.C. 154(b) by 0 days.

(21) Appl. No.: 09/870,761

(22) Filed: Jun. 1, 2001

(51) Int. Cl.[7] ............................................. F16D 51/00
(52) U.S. Cl. ............................. 188/79.51; 188/196 BA
(58) Field of Search ........................... 188/79.51, 78, 188/325, 331, 196 B, 196 BA, 79.55

(56) References Cited

U.S. PATENT DOCUMENTS

| | | | | |
|---|---|---|---|---|
| 3,282,241 A | * | 11/1966 | Forbush | 116/67 R |
| 3,605,085 A | * | 9/1971 | Fiorita et al. | 188/1.11 L |
| 5,193,653 A | * | 3/1993 | Carr | 188/196 BA |
| 5,377,793 A | * | 1/1995 | Livingston et al. | 188/331 |
| 5,480,010 A | * | 1/1996 | Johannesen | 188/196 BA |
| 5,823,636 A | * | 10/1998 | Parker et al. | 188/106 F |

* cited by examiner

Primary Examiner—Pam Rodriguez
(74) Attorney, Agent, or Firm—Jack C. Munro

(57) ABSTRACT

An adjuster for establishing the non-braking position of a vehicular brake pad assembly which takes the form of a shaft that is mounted in a sleeve with the inner end of the shaft to threadably engage with a series of female threads mounted within the sleeve. The shaft includes a manually connectable star wheel. A seal is located between the sleeve and the shaft which prevents entry of dust and water within the sleeve. A star wheel is mounted on the shaft and is manually connectable to affect rotation of the shaft relative to the sleeve which will result in the shaft longitudinally moving relative to the sleeve.

9 Claims, 2 Drawing Sheets

STAINLESS STEEL BRAKE STAR ADJUSTER

BACKGROUND OF THE INVENTION

1. Field of the Invention

The subject matter of the present invention is related to an adjuster for establishing the clearance position or non-braking position of a vehicular brake pad assembly and more particularly to constructing of this adjuster to eliminate corrosion due to contamination by water and also eliminate contamination by dust and dirt.

2. Description of the Related Art

It is a requirement to slow and stop a vehicle. In order to slow and stop a vehicle, a brake is used. Typical vehicles would be automobiles, trucks and trailers. Brakes that are utilized in conjunction with vehicles take a variety of forms. Each form of brake is of a frictional type in which a fixed surface is brought into contact with a moving part which is to be slowed or stopped. The fixed surface and the moving surface are rubbed together and energy stored in the moving part is converted into heat and dissipated to the atmosphere. The loss of energy from the moving part is accompanied by a desired reduction of movement. Vehicular brakes generally take two forms that being a drum brake assembly or a disc brake assembly.

In the internal expanding type of drum brake assembly, two brake shoes on a fixed mounting are pushed against the inside of a rotating drum to create the required braking force. Generally, the shoes are moved hydraulically. On a drum type of brake, one brake shoe is self energizing and the other shoe is not. If the drum rotation is clockwise, it tends to pull the shoe on the right harder against the inner surface so that the braking affect is increased. This shoe is called the leading shoe. The other shoe, which is the trailing shoe, is pushed off by the transfer from rear axle to front axle during normal braking.

Within a drum brake assembly, there is a need to locate the brake linings just at a non-braking position so that only a minimal amount of movement is required of the brake pads in order to achieve a braking position. In order to achieve this, included within the brake drum assembly is an adjuster and this adjuster is to be manually activated to move the brake pads tightly against the drum which will establish the braking position. The adjuster is then loosened until the brake pads assume a clearance position which will permit free rotation of the moving part, which is the wheel, relative to the fixed part, which is the drum.

Drum brake assemblies rather than disc brake assemblies, are commonly used in conjunction with trailers, and specifically boat trailers. It is common for boat trailers to be submerged within water on the launching ramp for the boat. When the water comes into contact with the adjuster mechanism of the brake drum assembly, the moisture will quickly cause corrosion of the adjuster with the result that in a short period of time the adjuster becomes inoperable and requires replacement. If the water happens to be salt water, the problem is magnified as salt water is especially corrosive. The time period which will pass before non-operation of the adjuster is even shortened than if it were fresh water.

There is a need to construct the adjuster mechanism of a brake drum assembly so that this adjuster mechanism is free from corrosion due to contamination with any kind of water and also free from contamination by dust and dirt.

SUMMARY OF THE INVENTION

The basic embodiment of the present invention comprises an adjuster for establishing the non-braking position of a vehicular brake pad assembly. The adjuster includes a sleeve which has an internal chamber. Within the internal chamber is located female screw threads. The internal chamber has an entry opening. The sleeve terminates in a first outer end with the first outer end adapted to connect with a first brake pad unit of the brake pad assembly. A shaft has a series of male screw threads with these male screw threads to be located within the internal chamber of the sleeve with the male screw threads to engage with the female screw threads. The shaft has a second outer end located exteriorly of the internal chamber. The second outer end is adapted to connect with the second brake pad unit of the brake pad assembly. A star wheel is mounted on the second outer end with the star wheel being manually engagable to affect turning of the shaft relative to the sleeve with the male screw threads moving relative to the female screw threads. A seal is located within the internal chamber and establishes a watertight and dust tight connection between the shaft and the sleeve preventing water and dust from entering the internal chamber.

A further embodiment of this invention is where the basic embodiment is modified to where there is a non-threaded area included within the internal chamber of the sleeve.

A still further embodiment of this invention is where the basic embodiment is modified by the first outer end being closed.

In yet a still further embodiment of this invention, the basic embodiment is modified to where the seal is defined as being an O-ring.

In a still further embodiment of this invention, the basic embodiment is modified by the seal being located directly adjacent the entry opening into the internal chamber.

In yet a still further embodiment of this invention, the basic embodiment is modified by the first outer end being non-rotatably fixed relative to the first brake pad unit.

In yet a still further embodiment of this invention, the basic embodiment is modified to where the second outer end is non-rotatably fixed relative to the second brake pad unit.

In yet a further embodiment of this invention, the basic embodiment is modified by the seal being mounted on the sleeve.

In yet a further embodiment of this invention, the basic embodiment is modified by the sleeve and the shaft both being constructed of stainless steel.

BRIEF DESCRIPTION OF THE DRAWINGS

For a better understanding of the present invention, reference is to be made to the accompanying drawings. It is to be understood that the present invention is not limited to the precise arrangement shown in the drawings.

DETAILED DESCRIPTION OF THE INVENTION

Figure 1:
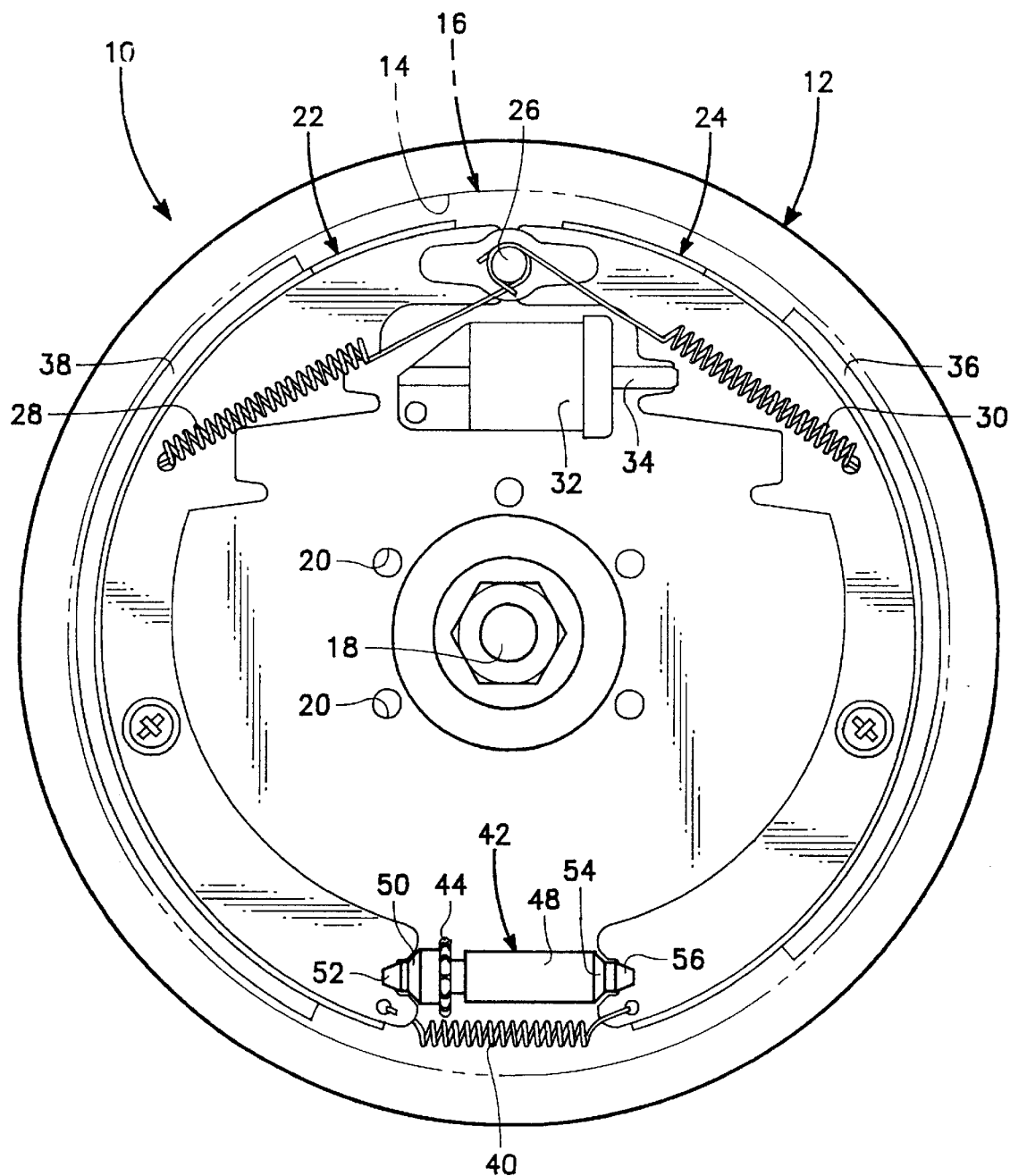
FIG. 1 is a front elevational view of a brake drum assembly within which has been mounted the adjuster of the present invention.
Figure 2:
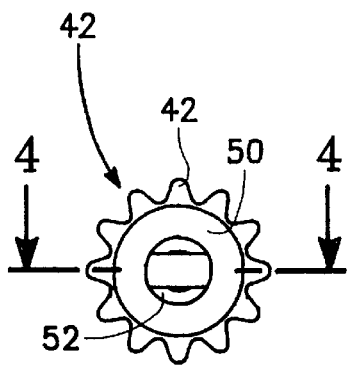
FIG. 2 is a front end view of the adjuster of the present invention.
Figure 3:
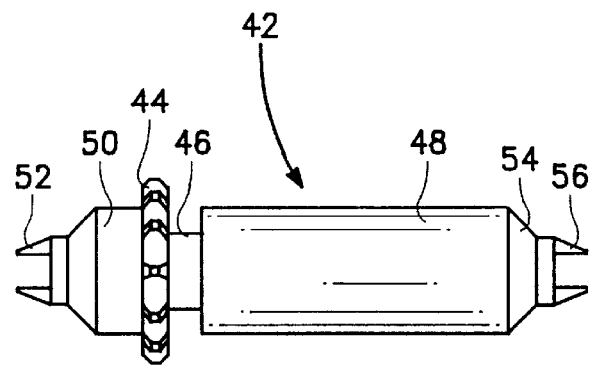
FIG. 3 is a side elevational view of the adjuster of the present invention.
Figure 4:
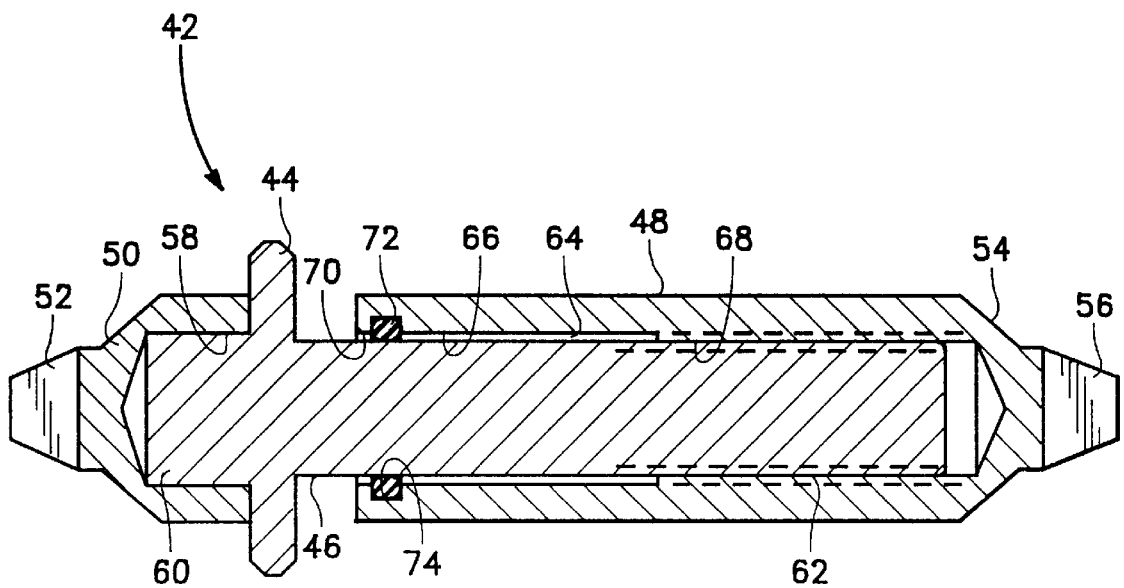
FIG. 4 is a longitudinal cross-sectional view of the adjuster of the present invention taken along line 4—4 of FIG. 2.

Referring particularly to the drawings, there is shown in FIG. 1 a drum brake pad assembly 10 which includes a fixed baseplate 12, a drum 16, which is shown only partially, which has an annular braking surface 14. The braking surface 14 is in the shape of a circle. The drum 16 is permitted to rotate about an axle 18. A wheel (not shown) is to be mounted by bolts (not shown) to the drum 16. The baseplate 12 is fixedly mounted to the vehicle by bolts (not shown) which are to engage with the wheel mounting holes 20. There are five in number of the holes 20 shown.

The baseplate 12 has mounted thereon a first brake pad unit 22 and a second brake pad unit 24. The brake pad units 22 and 24 are each independently mounted on a pin 26. The pin 26 is fixedly mounted on the baseplate 12. A spring 28 connects between the first brake pad unit 22 and the pin 26 with a similar spring 30 connecting between the brake pad unit 24 and the pin 26. The function of each of the springs 28 and 30 is to exert a continuous bias against the brake pad units 22 and 24 tending to move such closer together or tending to move the brake pad unit 22 counterclockwise and the brake pad unit 24 clockwise.

A cylinder 32 is mounted between the brake pad units 22 and 24. It will be the function of the cylinder 32 to receive hydraulic pressure and cause extension of an actuator 34 which can be moved outwardly by hydraulic pressure against the brake pad unit 24 which will tend to move the brake pad unit 24 in a counterclockwise direction pushing brake lining 36 against the braking surface 14. Simultaneously, brake pad unit 22 will be moved clockwise with the brake lining 38 being moved against the braking surface 14. When the hydraulic pressure is released from the cylinder 32, which is applied by application of a brake pedal mounted within the vehicle, the coil spring 40 causes the brake pad unit 24 to move clockwise and the brake pad unit 22 to move counterclockwise a small distance until the brake linings 36 and 38 no longer contact the braking surface 14. This clearance position of the brake linings 36 and 38 is desired to be initially established by an adjuster 42 which constitutes the structure of the present invention. It is to be understood that as the brake linings 36 and 38 wear and become less in thickness, that it is desirable to readjust the brake pad units 22 and 24 to establish a new clearance position. This readjusting is accomplished by placing a tool, such as a screwdriver (not shown), in contact with the star wheel 44 of the adjuster 42 and cause rotation of the star wheel 44. This rotation will cause the shaft 46 to be moved away from the sleeve 48. This will result in the brake linings 36 and 38 being moved closer to the braking surface 14 which will compensate for the wear that has occurred on the brake linings 36 and 38.

The shaft 46 has a closed outer end 50. The closed outer end 50 has a bifurcated tip 52. The bifurcated tip 52 is to connect with the first brake pad unit 22 in a non-rotative engaging manner.

The sleeve 48 has a closed outer end 54. The closed outer end 54 includes a bifurcated tip 56. The bifurcated tip 56 is to connect with the second brake pad unit 24 in a non-rotative engaging manner. The result is the outer end 50 is rotatably fixed relative to the first brake pad unit 22 and the outer end 54 is rotatably fixed relative to the second brake pad unit 24.

The outer end 50 includes a cylindrical hole 58. Mounted within the cylindrical hole 58 is cylindrical end 60 of the shaft 46. The cylindrical end 60 is capable of being rotated relative to the outer end 50. The star wheel 44 is integrally formed on the shaft 46 and is located directly adjacent the cylindrical end 60. At all times, the star wheel 44 will abut against the outer end 50.

The shaft 46 includes a series of male threads 62. The portion of the shaft 46 that includes the male threads 62 is to be locatable within internal chamber 64 of the sleeve 48. The internal chamber 64 is divided between an unthreaded section 66 and a female threaded section 68. It is to be noted that the length of the threaded section 68 is approximately equal to the length of the unthreaded section 66 with the threaded section 68 being located directly adjacent the closed outer end 54. Also included within the internal chamber 66 and located directly adjacent the entry opening 70 is an O-ring seal 72. The O-ring seal 72 is shown mounted within annular grove 74 which is mounted within the wall surface of the internal chamber 64.

It is to be made apparent that when the adjuster 42 is installed, as shown within FIG. 1, that water and dust is prevented from entering in the area of the threaded connection provided by male threads 62 and the female threads 68 due to the inclusion of the O-ring seal 72 which is mounted in conjunction with the threaded section 66 and forms a watertight and dust tight seal with the exterior surface of the shaft 46. However, this seal 72 will still permit the shaft 46 to be pivoted or rotated by connection by a hand tool, such as a screwdriver, with the star wheel 44.

It is to be understood that for purposes minimizing the affect of corrosion by water, and particularly salt water, that the shaft 46, outer end 50 and sleeve 48 and its outer end 54 will all be constructed of stainless steel.

The present invention may be embodied in other specific forms without departing from the essential attributes thereof. Reference should be made to the appending claims rather than the foregoing specification as indicating the scope of the invention.

What is claimed is:

1. An adjuster for establishing the non-braking position of a vehicular brake pad assembly comprising:

a sleeve having an internal chamber, said internal chamber including a series of female screw threads, said internal chamber having an entry opening, said sleeve having a first outer end, said first outer end adapted to connect with a first brake pad unit of said brake pad assembly;

a shaft having male screw threads which is to be located within said internal chamber with said male screw threads engaging with said female screw threads, said shaft having a second outer end located exteriorly of said internal chamber, said second outer end adapted to connect with a second brake pad unit of said brake pad assembly;

a star wheel secured to said second outer end, said star wheel being manually connectable to affect turning of said shaft relative to said sleeve with said male screw threads moving relative to said female screw threads;

a seal located within said internal chamber establishing a watertight and dust tight connection between said shaft and said seal preventing water and dust from entering said internal chamber; and said sleeve having a non-threaded area adjoining said female screw threads, said non-threaded area being almost of equal length to the length of said female screw threads, whereby said male screw threads of said shaft can be freely telescopingly moved through said non-threaded area prior to encountering engagement with said female screw threads.

2. The adjuster as defined in claim 1 wherein:

said sleeve having a closed end, said first outer end being located at said closed end.

3. The adjuster as defined in claim 1 wherein:

said seal comprising an O-ring.

4. The adjuster as defined in claim 1 wherein:

said seal being located directly adjacent said entry opening.

5. The adjuster as defined in claim 1 wherein:

said first outer end being non-rotatably fixed relative to said first brake pad unit.

6. The adjuster as defined in claim 5 wherein:

said second outer end being non-rotatably fixed relative to said second brake pad unit.

7. The adjuster as defined in claim 1 wherein:

said seal being mounted on said sleeve.

8. The adjuster as defined in claim 1 wherein:

said sleeve and said shaft being constructed of stainless steel.

9. The adjuster as defined in claim 1 wherein:

said shaft being rotatable in relation to said second outer end.

* * * * *